(No Model.)
H. B. EWBANK, Sr.
PNEUMATIC SADDLE FOR BICYCLES.
No. 592,488. Patented Oct. 26, 1897.
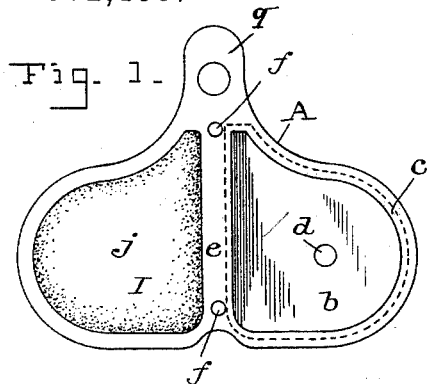
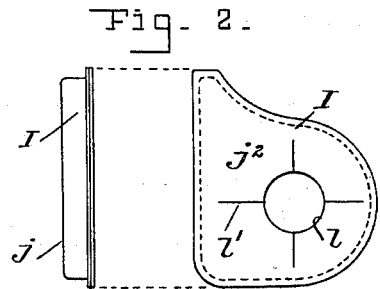
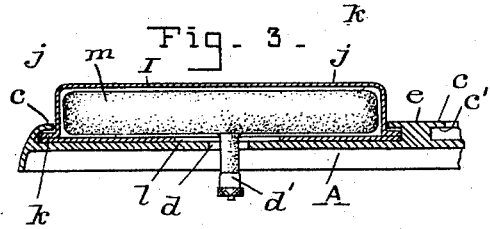
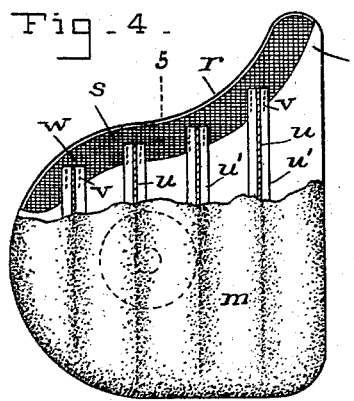
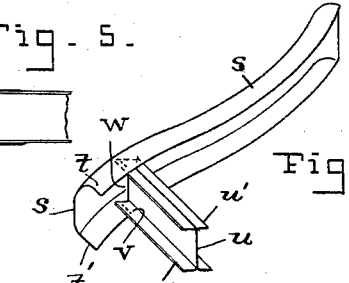
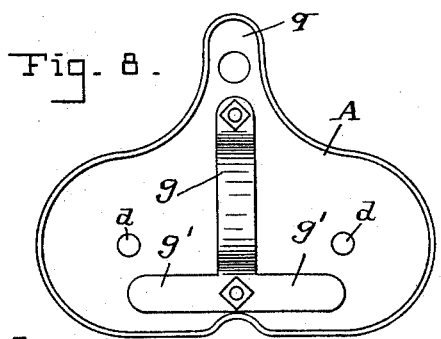
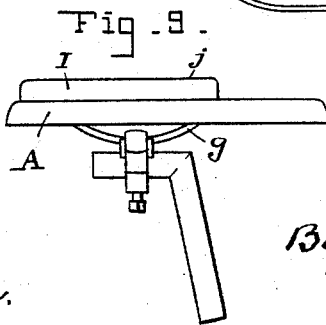
WITNESSES:
Lee I. Van Horn.
Charles B. Mann Jr.
INVENTOR:
H. B. Ewbank Sr.
By Chas. B. Mann
ATTORNEY.

UNITED STATES PATENT OFFICE.

HERBERT B. EWBANK, SR., OF BALTIMORE, MARYLAND, ASSIGNOR, BY DIRECT AND MESNE ASSIGNMENTS, TO JULIA F. EWBANK AND ELIZABETH D. CRAWFORD, OF SAME PLACE.

PNEUMATIC SADDLE FOR BICYCLES.

SPECIFICATION forming part of Letters Patent No. 592,488, dated October 26, 1897.

Application filed July 6, 1896. Serial No. 598,078. (No model.)

*To all whom it may concern:*

Be it known that I, HERBERT B. EWBANK, Sr., a citizen of the United States, residing at Baltimore, in the State of Maryland, have invented certain new and useful Improvements in Pneumatic Saddles for Bicycles, of which the following is a specification.

This invention relates to an improved construction of cushion for pneumatic saddles for bicycles.

The present invention has for its object to provide for overcoming objections that are found to exist in the rubber air-bag which is inclosed in the leather case having a flange which confines the case in a socket on the seat-plate. In these saddles there is a forward projecting part at the center of the rubber air-bag corresponding to the pommel-point of the saddle plate or frame and a hollowed curved edge in the rubber air-bag at each side of said pommel-point. These two hollow curved edges are subjected to rapid and constant alternate compression and relaxation by the legs of the bicycle-rider as he operates the crank-pedals, and the effect is to weaken and wear out the rubber at this part. It is also found that the air-bag when inflated swells up too much at the center.

As heretofore made when the air-bag is inflated hard, as many persons prefer to have it, the result is to lift the pneumatic cushion out of the socket in the seat-plate, thus disabling it for use. The cause of this is that the swelling up of the top of the cushion contracts the sides of the case and disengages the flanges of said case from the undercut groove in the seat-plate, and thereby allows the cushion to lift out of the socket.

My improvement therefore consists in providing a reinforced edge for the rubber air-bag, the same consisting of a fabric of strong thin flexible material, secured on the inner surface of the rubber air-bag at said front hollow curved edge, and also providing inner stays of like fabric material securing the upper surface of said rubber air-bag to the bottom and likewise securing the upper and lower flanged edges of said reinforce. By this means the cushion air-bag is strengthened at the front edge and the liability of the exterior case becoming detached from the socket in the seat-plate is obviated.

The invention is illustrated in the accompanying drawings, in which—

Figure 1 is a top view of a saddle, showing one cushion only in position. Fig. 2 shows two views, a bottom and an edge view, of the leather case. Fig. 3 is a cross-section of one cushion and the saddle-plate and shows the flange of the leather case engaged with the undercut groove in the socket on the saddle-plate. Fig. 4 is a view of one rubber air-bag, the top surface of which is partly broken away. Fig. 5 is a broken section view of the air-bag on the line indicated by 5 in Fig. 4. Fig. 6 is a view of the reinforce for the edge of the air-bag and of one of the stays secured to the upper and lower flange edges thereof. Fig. 7 is a cross-section of the air-bag. Fig. 8 is an inverted or bottom plan of the saddle-plate. Fig. 9 is a side view of the saddle as it appears mounted on the saddle-post of a bicycle.

The plate A has two seat-sockets $b$, each provided with a surrounding flange $c$, having an internal undercut $c'$. A hole $d$ is through the plate in each seat-socket. A space $e$ extends fore and aft and separates the two sockets, and holes $f$ in this space receive screws or rivets for securing the spring-bar $g$ on the lower side of the plate.

The exterior leather case I of each cushion has an outwardly-projecting flange $k$ in a plane even with its bottom. This case is hollow, and its bottom $j^2$ has an aperture $l$ and radiating slits $l'$. This aperture admits the air-bag $m$ and enables the air-bag to be withdrawn.

The pneumatic cushions are confined to their position in the seat-sockets by the outwardly-projecting flange $k$ of each exterior case engaging the undercut groove $c'$, surrounding the said sockets.

The parts thus far described are the same as shown in the application for patent filed June 18, 1896, Serial No. 595,960, by H. B. Ewbank, Jr.

The air-bag $m$ has the same general shape and form as the leather case and is provided with a screw nipple or tube $d'$, which projects through the aperture in the case and also through the hole $d$ in the plate A. The rubber air-bag $m$ has a forward-projecting pommel part $q'$ and a front hollow curved edge $r$ adjoining said part. A fabric reinforce $s$ has an upper flange $t$ and a lower flange $t'$ and is cemented firmly to the inner surface of said front hollow curved edge. A number of stay-strips $u$ are inside of the bag and have flanges $u'$, which are cemented to the top surface and also to the bottom surface of the air-bag and also secured by stitches $v$ and cemented to the said upper and lower flanged edges of the reinforce $s$. An open space or passage $w$ is left between the end of each stay and the said reinforce. By this construction of air-bag cushion having stays and reinforce only at the front edges and secured to the stays the air-bag is strengthened at its weak part and all other parts are left soft and flexible.

The spring-bar $g$ on the lower side of the plate has two rear lateral arms $g'$, T-shaped. These arms serve to prevent the plate from tilting.

Having thus described my invention, what I claim is—

In a pneumatic saddle for bicycles the combination of a plate provided with seat-sockets each having a surrounding flange projecting horizontally inward toward the socket and forming an undercut groove; a flexible exterior cushion-case having an outwardly-projecting flange which engages the said undercut groove; and an air-bag inclosed within said cushion-case and having inner stay-strips connecting the top and bottom surfaces of the air-bag, whereby the air-bag may be inflated without liability of disengaging the flanges of the exterior case from the grooves of the seat-socket, as set forth.

In testimony whereof I affix my signature in the presence of two witnesses.

HERBERT B. EWBANK, Sr.

Witnesses:
CHARLES B. MANN, Jr.,
PH. H. HOFFMAN.